(12) United States Patent
Kang et al.

(10) Patent No.: US 10,274,815 B2
(45) Date of Patent: Apr. 30, 2019

(54) PROJECTOR

(71) Applicant: LG ELECTRONICS INC., Seoul (KR)

(72) Inventors: Shingyu Kang, Seoul (KR); Heechul Shin, Seoul (KR); Junho Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/639,621

(22) Filed: Jun. 30, 2017

(65) Prior Publication Data

US 2018/0046069 A1    Feb. 15, 2018

(30) Foreign Application Priority Data

Aug. 12, 2016    (KR) .................. 10-2016-0102803

(51) Int. Cl.
*G03B 21/14*    (2006.01)
*G03B 21/20*    (2006.01)
*G03B 33/08*    (2006.01)

(52) U.S. Cl.
CPC ......... *G03B 21/204* (2013.01); *G03B 21/208* (2013.01); *G03B 21/2066* (2013.01); *G03B 33/08* (2013.01)

(58) Field of Classification Search
CPC .................. G03B 21/208; G03B 21/2066
USPC ........................................... 353/31
See application file for complete search history.

(56) References Cited

U.S. PATENT DOCUMENTS

| | | | | |
|---|---|---|---|---|
| 5,930,050 A | * | 7/1999 | Dewald | G02B 13/08 348/756 |
| 6,317,171 B1 | * | 11/2001 | Dewald | H04N 5/7458 348/756 |
| 6,666,557 B1 | * | 12/2003 | Choi | H04N 5/74 348/E5.137 |
| 2002/0171809 A1 | * | 11/2002 | Kurtz | G02B 5/3058 353/20 |
| 2006/0033886 A1 | * | 2/2006 | Kim | G03B 21/2013 353/37 |
| 2007/0052933 A1 | * | 3/2007 | Jung | H04N 5/74 353/88 |
| 2011/0051102 A1 | * | 3/2011 | Ogura | G03B 21/204 353/85 |
| 2014/0078475 A1 | | 3/2014 | Masuda | |

(Continued)

FOREIGN PATENT DOCUMENTS

| | | |
|---|---|---|
| KR | 10-2013-0035678 A | 4/2013 |
| KR | 10-2015-0066922 A | 6/2015 |
| WO | WO 2015/072319 A1 | 5/2015 |

*Primary Examiner* — Christopher M Raabe
(74) *Attorney, Agent, or Firm* — Birch, Stewart, Kolasch & Birch, LLP

(57) ABSTRACT

A projector is provided. The projector includes: a fluorescent wheel; at least one first light source that emits light toward the fluorescent wheel; and a fly eye lens that uniformalizes light, having transmitted the fluorescent wheel. Therefore, a fly eye lens is used instead of a light tunnel and a transmissive fluorescent wheel is used and thus it is unnecessary to divide a lens configuration of transmitting light and reflecting light. Accordingly, the number of optical systems can be reduced and thus efficiency of a projector can be enhanced and a size and production cost of the projector can be reduced.

8 Claims, 5 Drawing Sheets

(56) References Cited

U.S. PATENT DOCUMENTS

| | | | |
|---|---|---|---|
| 2014/0185018 A1* | 7/2014 | Tohara | H04N 9/3152 |
| | | | 353/31 |
| 2015/0138446 A1* | 5/2015 | Sheng | G03B 21/008 |
| | | | 348/766 |
| 2017/0139312 A1* | 5/2017 | Kato | G02B 26/008 |

* cited by examiner

PROJECTOR

This application claims the benefit of Korean Patent Application No. 10-2016-0102803 filed on Aug. 12, 2016, the entire contents of which are incorporated herein by reference for all purposes as if fully set forth herein.

BACKGROUND OF THE INVENTION

Field of the Invention

The present invention relates to a projector.

Discussion of the Related Art

As a projection device that projects image or screen data on a screen, a projector is widely used. The projector may focus light emitted from a light source to a panel and display the light on a screen.

Further, nowadays, technology development on a micro projector that projects and displays an image stored at a portable device to the outside has been rapidly performed.

In such a projector, a lamp that emits white light has been generally used, but nowadays, a light emitting diode (LED) light source is used. This is because with the development of light source production technology, a life-span of an LED light source is extended, efficiency thereof is enhanced, and the LED light source may be easily produced in a small size. However, the LED light source has a drawback that brightness thereof is relatively low. Accordingly, a projector using a laser diode having a light source of high brightness and a long life-span is recently used.

SUMMARY OF THE INVENTION

In accordance with an aspect of the present invention, a projector includes: a fluorescent wheel; at least one first light source that emits light toward the fluorescent wheel; and a fly eye lens that uniformalizes light, having transmitted the fluorescent wheel.

The at least one first light source may be a laser diode that emits blue light

The projector may further include an anamorphic lens that changes a rate of light, having passed through the fly eye lens The fluorescent wheel may be a transmissive fluorescent wheel that transmits light The fluorescent wheel may include: a diffusion area that diffuses transmitted light; and an emission area that converts incident light to light of another wavelength.

The projector may further include: a dichroic mirror located between the fluorescent wheel and the fly eye lens; and at least one second light source located in a direction orthogonal to the first light source and that emits light toward the dichroic mirror.

The projector may further include an anamorphic lens that changes a rate of light, having passed through the fly eye lens.

The at least one second light source may be a light emitting diode that emits red light.

The dichroic mirror may reflect red light and transmit other color light.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
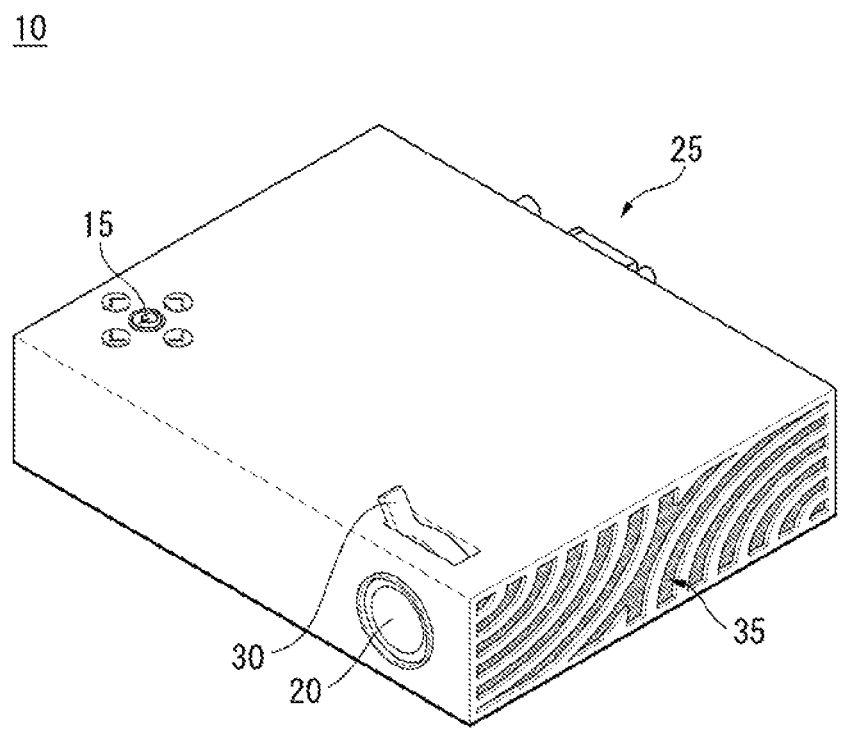
FIG. 1 is a perspective view illustrating an external appearance of a projector according to an exemplary embodiment of the present invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

FIG. 1 is a perspective view illustrating an external appearance of a projector according to an exemplary embodiment of the present invention.

As shown in FIG. 1, a projector 10 according to an exemplary embodiment of the present invention may include a lens portion 20, a power source unit 15, a focus portion 30, and a connecting portion 25. The projector 10 may have a cuboid shape. The projector 10 may project and display an input image or a screen to the outside. The projector 10 may include a lighting optical system and a projection optical system. The lighting optical system may be an optical system disposed on a light path from a light source to a display panel, and the projection optical system may be an optical system disposed on a light path from a display panel to a projection lens.

The lens portion 20 may be located at one side of a front surface of the projector 10. The lens portion 20 may be a portion that projects an image or a screen to the front side. The lens portion 20 may have a circular shape.

The power source unit 15 may be located at an upper surface of the projector 10. The power source unit 15 may be a portion that turns on/off power of the projector 10. Further, one end of the power source unit 15 may move in a front-rear direction and a lateral direction. That is, the power source unit 15 may perform a joystick function. Accordingly, the power source unit 15 may perform a function of menu selection and channel adjustment.

The focus portion 30 may be located at a portion adjacent to the lens portion 20 of an upper surface of the projector 10. The focus portion 30 may have a shape in which a lever is protruded to the upper side of the projector 10. When rotating the focus portion 30 in a lateral direction, a focus of an image or a screen may be adjusted. In the projector 10 according to an exemplary embodiment of the present invention, because the focus portion 30 is separated from the lens portion 20, when adjusting a focus, the lens may not be damaged.

The connecting portion 25 may be located at a rear surface of the projector 10. The connecting portion 25 may be a portion that transfers a signal to the projector 10. For example, the connecting portion 25 may transfer a signal of an image and power. For example, the connecting portion 25 may include a Universal Serial Bus (USB) terminal, a High Definition Multimedia Interface (HDMI)/Mobile High-definition Link (MHL) terminal, an Audio/Video (AV) terminal, an earphone hole, and a red, green, and blue (RGB) terminal.

At both side surfaces of the projector 10, a ventilation portion 35 may be located. The ventilation portion 35 may include a plurality of holes. An internal heat of the projector 10 may be easily escaped to the outside through a plurality of holes.

Figure 2:
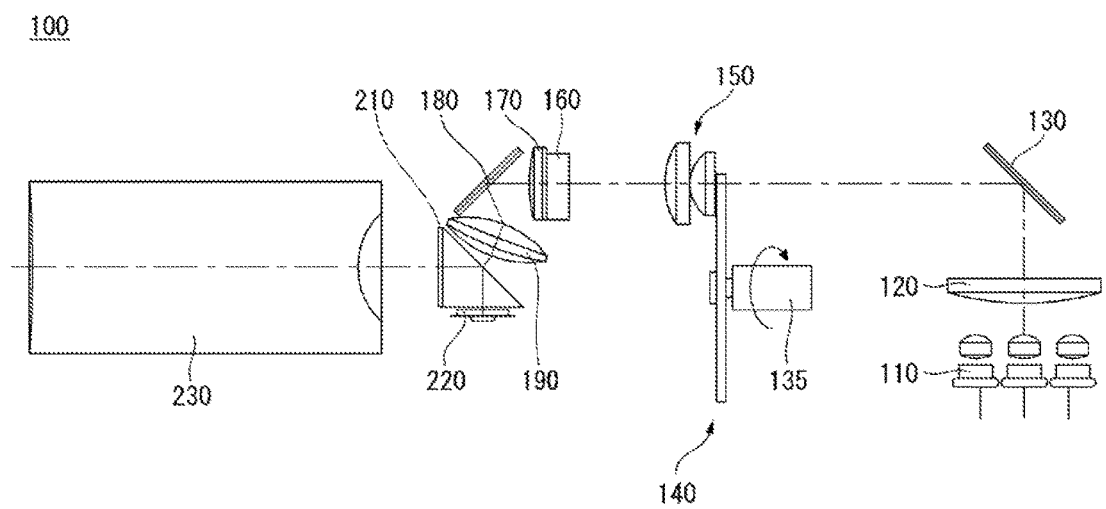
FIG. 2 is a diagram illustrating a lighting optical system of a projector according to an exemplary embodiment of the present invention.

FIG. 2 is a diagram illustrating a lighting optical system of a projector according to an exemplary embodiment of the present invention.

As shown in FIG. 2, a lighting optical system 100 of the projector 10 may include a first light source 110, a focusing lens 120, first and second mirrors 130 and 180, a fluorescent wheel 140, a first collimator lens 150, a fly eye lens 160, a lighting lens 170, an anamorphic lens 190, a prism 210, a display panel 220, and a projection lens 230.

The first light source 110 may be a laser light source. The first light source 110 may emit UV or blue light. The first light source 110 may exist in the plural.

The focusing lens 120 may be located opposite to the first light source 110. The focusing lens 120 may focus light emitted from the first light source 110. The focusing lens 120 may be any one of a Meniscus-convex in which both surfaces of a lens are bent in the same direction, a Biconvex in which both surfaces of a lens are bent in different directions, and a Plano-concave in which one surface of a lens is convexly bent. The focusing lens 120 may include glass or plastic.

The first mirror 130 may reflect light focused through the focusing lens 120 in different directions. For example, the first mirror 130 may change a direction of focused light by an angle 90° in a direction of the fluorescent wheel 140.

The fluorescent wheel 140 may be located at an advancing location of light whose direction is changed by the first mirror 130. The fluorescent wheel 140 may have a circular shape. A motor 135 is connected to a central portion of the fluorescent wheel 140 and thus the fluorescent wheel 140 may rotate in a predetermined velocity. The fluorescent wheel 140 may be a transmissive fluorescent wheel 140 that transmits light. A detailed shape of the fluorescent wheel 140 will be described later. The fluorescent wheel 140 may implement red light, green light, yellow light, and blue light using emitted blue light.

The first collimator lens 150 may focus light and convert light, having passed through the fluorescent wheel 140 to collimated light. The first collimator lens 150 may include glass or plastic.

The fly eye lens 160 may convert light converted to collimated light to have uniform luminous intensity. The fly eye lens 160 may include glass or plastic.

Uniformalized light may lighten the second mirror 180 through the lighting lens 170. The second mirror 180 may reflect uniformalized light in different directions. For example, the second mirror 180 may change a direction of focused light by an angle 90° in a direction of the display panel 220.

Light reflected by the second mirror 180 may pass through the anamorphic lens 190. The anamorphic lens 190 may change magnification power of arriving light. For example, the anamorphic lens 190 may change light having an oval rate reflected by the second mirror 180 to light having a rectangle rate. Light may be changed and arrived to correspond to a rate of the display panel 220 through the anamorphic lens 190.

Light, having passed through the anamorphic lens 190 may change a light path while passing through a prism 210. Light having a changed light path may advance to the display panel 220. As the prism 210, a Reverse Total Internal Reflection Prism (RTIR) may be used.

When light arrives with a changed rate by the anamorphic lens 190, the display panel 220 may output image information by a process such as switching or reflection. The display panel 220 may be any one of a digital micromirror device (DMD), a liquid crystal on silicon (LCoS), a grating light valve (GLV), a spatial potical modulator (SOM), and a liquid crystal device (LCD).

Light emitted from the display panel 220 may be projected on a screen through the projection lens 230 by the prism 210.

In a projector according to an exemplary embodiment of the present invention, because it is unnecessary to make different a lens configuration of light that transmits a fluorescent wheel and light that reflects a fluorescent wheel using the transmissive fluorescent wheel 140, the fly eye lens 160, and the anamorphic lens, the number of the optical systems may be largely reduced. Accordingly, efficiency of the projector can be enhanced and a size thereof can be reduced.

Figure 3:
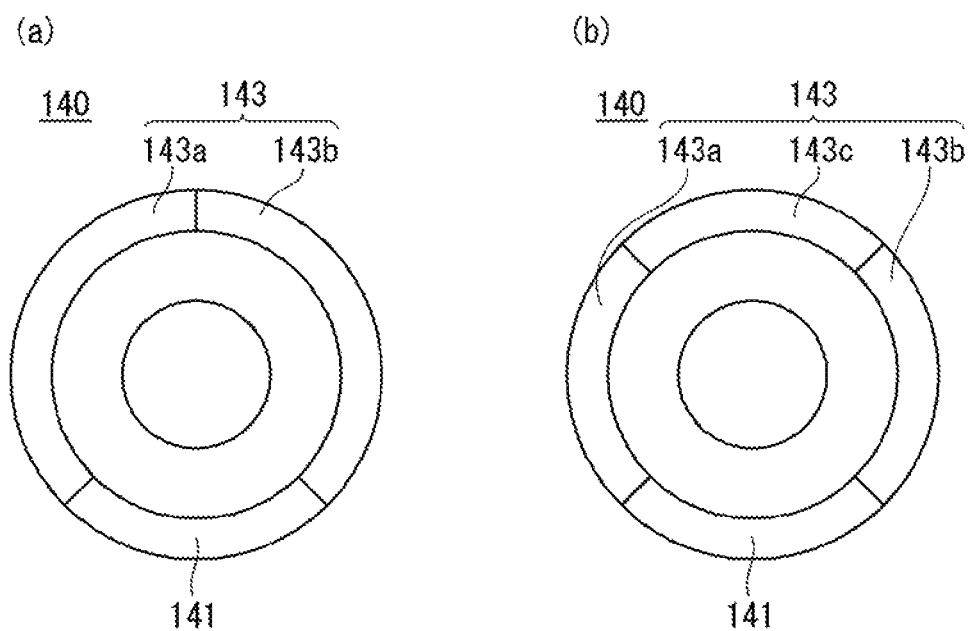
FIG. 3 is a diagram illustrating a fluorescent wheel according to an exemplary embodiment of the present invention.

FIG. 3 is a diagram illustrating a fluorescent wheel according to an exemplary embodiment of the present invention.

As shown in FIG. 3A, the fluorescent wheel 140 may include a diffusion area 141 that receives and diffuses light from a light source and an emission area 143 that receives light from a light source to emit fluorescent light. The diffusion area 141 and the emission area 143 may be located at an outer circumference portion of the fluorescent wheel 140. A central portion of the fluorescent wheel 140 may be a rotation shaft of the motor 135.

The diffusion area 141 may be formed at one side of an outer circumference of the fluorescent wheel 140. When blue light emitted from a light source by an optical processing of a surface is transmitted, the light may be diffused in the diffusion area 141. The present invention is not limited thereto and the diffusion area 141 may be formed by attachment of an optical material.

The emission area 143 may be formed at the other side of an outer circumference of the fluorescent wheel 140. The emission area 143 may convert incident light to light of another wavelength. The emission area 143 may be an area in which a phosphor of a color to convert is coated. The emission area 143 may include first and second areas 143a and 143b. The first area 143a may be an area that implements red light. The second area 143b may be an area that implements green light. That is, in the first area 143a, a phosphor that diffuses red light may be coated, and in the second area 143b, a phosphor that diffuses green light may be coated.

As shown in FIG. 3B, the emission area 143 may further include a third area 143c. The third area 143c may be an area that implements yellow light. That is, in the third area 143c, a phosphor that diffuses yellow light may be coated.

It is shown that the fluorescent wheel 140 according to an exemplary embodiment of the present invention is formed with the diffusion area 141 and the emission area 143. However, the present invention is not limited thereto. When a light source is UV light instead of blue light, an entire outer circumference portion of the fluorescent wheel 140 is formed with the emission area 143, and in at least a portion of the emission area 143, a phosphor that diffuses blue light may be coated.

The fluorescent wheel 140 according to an exemplary embodiment of the present invention may be a transmissive fluorescent wheel 140 in which the emission area 143 transmits light. Accordingly, because reflected light and transmitted light are not divided, the number of optical systems may be largely reduced.

Figure 4:
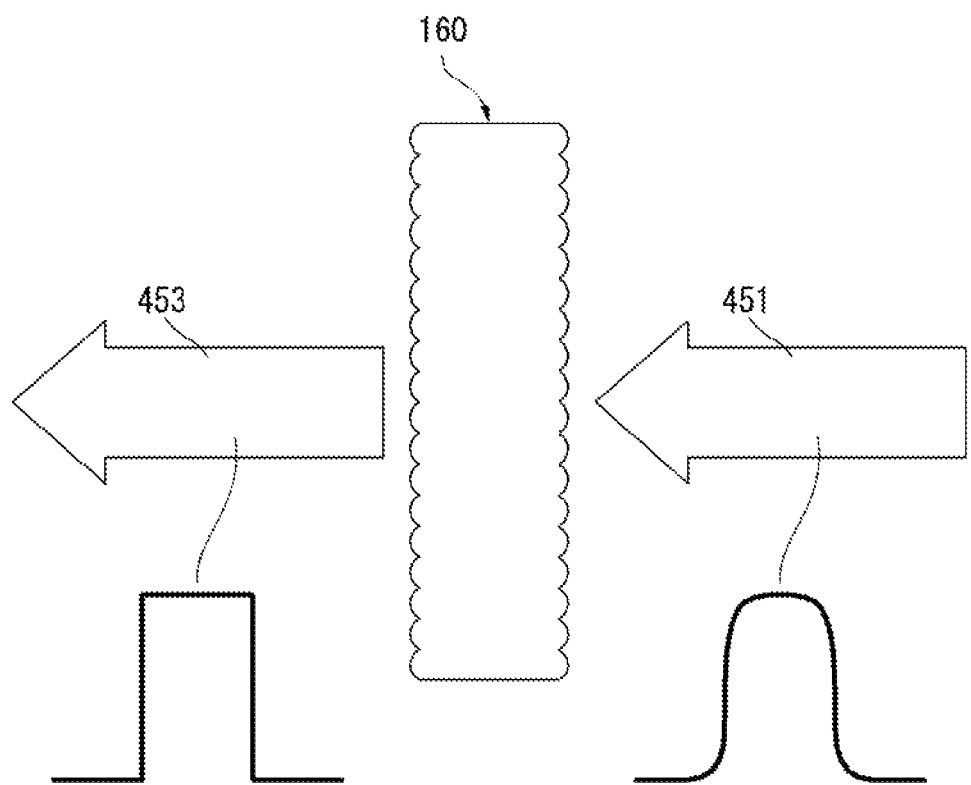
FIG. 4 is a diagram illustrating a change of light, having transmitted a fly eye lens according to an exemplary embodiment of the present invention.

FIG. 4 is a diagram illustrating a change of light that transmits a fly eye lens according to an exemplary embodiment of the present invention.

As shown in FIG. 4, at a front surface and a rear surface of the fly eye lens 160, a plurality of protruding portions may be located. Strength distribution of light 451 before transmitting the fly eye lens 160 may be gauss distribution. In this case, because strength of light is different according to a location, a clear image may not be implemented on a screen.

When light transmits the fly eye lens 160, strength distribution of light 453 may become uniform. That is, brightness of an entire portion may be similar. Accordingly, light of similar brightness arrives at an entire portion of the display panel and thus a clear image may be implemented on a screen.

Figure 5:
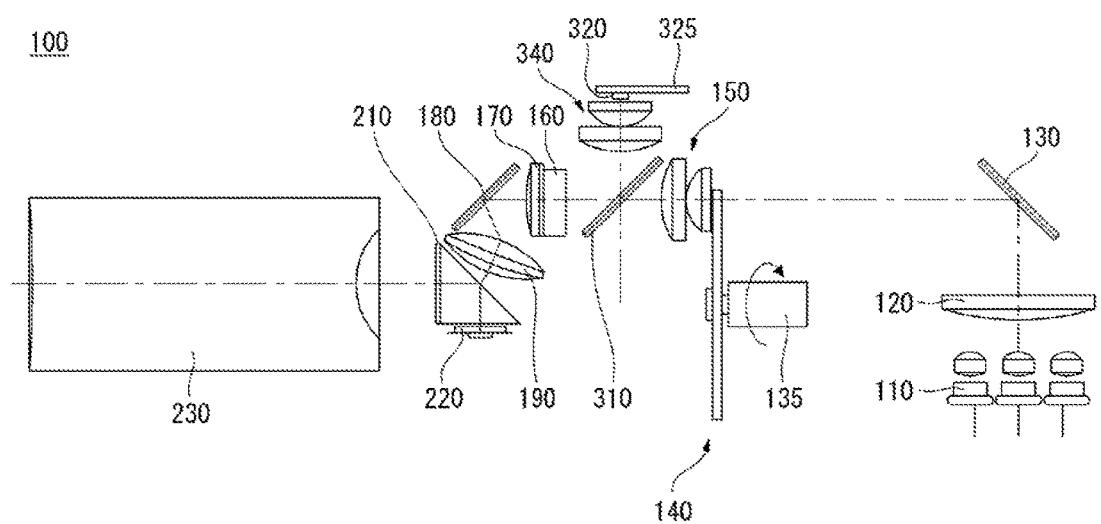
FIG. 5 is a diagram illustrating a lighting optical system of a projector according to another exemplary embodiment of the present invention.

FIG. 5 is a diagram illustrating a lighting optical system of a projector according to another exemplary embodiment of the present invention.

As shown in FIG. 5, the lighting optical system 100 of the projector 10 may include a first light source 110, a focusing lens 120, first and second mirrors 130 and 180, a fluorescent wheel 140, a first collimator lens 150, a fly eye lens 160, a lighting lens 170, an anamorphic lens 190, a prism 210, a display panel 220, a projection lens 230, a third mirror 310, a second light source 320, and a second collimator lens 340. That is, the lighting optical system of FIG. 1 may further include a third mirror 310, a second light source 320, and a second collimator lens 340.

The second light source 320 may be an LED light source. The second light source 320 may emit red light. The second light source 320 may exist in the plural.

The third mirror 310 may be a dichroic mirror. The third mirror 310 may change and reflect a direction of red light by an angle 90° and transmit other color light. Accordingly, light, except for red light among light emitted from the first light source 110 may be transmitted toward the fly eye lens 160.

The lighting optical system 100 of a projector according to an exemplary embodiment of the present invention uses red light of the second light source 320 instead of red light emitted by the fluorescent wheel 140 from the first light source 110 of a deteriorated quality, thereby saving a cost and enhancing a quality.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

Certain embodiments or other embodiments of the invention described above are not mutually exclusive or distinct from each other. Any or all elements of the embodiments of the invention described above may be combined or combined with each other in configuration or function.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A projector, comprising:
   a fluorescent wheel including a diffusion area for diffusing light in a direction which light is incident and an emission area for converting a wavelength of light and emitting light in the direction;

a laser diode providing light to the fluorescent wheel;

a fly eye lens that transmits light transmitted through the fluorescent wheel;

an anamorphic lens that transmits light transmitted through the fly eye lens; and a display panel reflecting light transmitted through the anamorphic lens.

2. The projector of claim 1, wherein the laser diode emits blue light.

3. The projector of claim 1, wherein the fluorescent wheel is a transmissive fluorescent wheel that transmits light.

4. The projector of claim 1, wherein the diffusion area diffuses transmitted light; and the emission area converts incident light to light of another wavelength.

5. The projector of claim 1, further comprising:

a dichroic mirror located between the fluorescent wheel and the fly eye lens; and at least one second light source located in an orthogonal direction to the laser diode and emitting light toward the dichroic mirror.

6. The projector of claim 5, wherein the at least one second light source is a light emitting diode that emits red light.

7. The projector of claim 5, wherein the dichroic mirror reflects red light and transmits other color light.

8. The projector of claim 1, wherein the anamorphic lens emits light at a first aspect ratio, wherein the display panel has a second aspect ratio, and wherein the first aspect ratio and the second aspect ratio are equal to each other.

* * * * *